United States Patent
Keesara et al.

(10) Patent No.: US 9,584,333 B2
(45) Date of Patent: Feb. 28, 2017

(54) OPTIMIZATION OF RULES USED FOR PREVENTION OF DUPLICATION AND LOOPING OF MULTICAST TRAFFIC WITHIN A MULTI-HOMED CLUSTER OF BACKBONE EDGE BRIDGES IN A SHORTEST PATH BRIDGING MULTICAST NETWORK

(71) Applicant: Avaya Inc., Basking Ridge, NJ (US)

(72) Inventors: Srikanth R. Keesara, Tewksbury, MA (US); Sakthivadivu Saravanaraj, Nashua, NH (US)

(73) Assignee: Avaya Inc., Basking Ridge, NJ (US)

( * ) Notice: Subject to any disclaimer, the term of this patent is extended or adjusted under 35 U.S.C. 154(b) by 207 days.

(21) Appl. No.: 14/136,240

(22) Filed: Dec. 20, 2013

(65) Prior Publication Data
US 2015/0180675 A1 Jun. 25, 2015

(51) Int. Cl.
H04L 12/18 (2006.01)
(52) U.S. Cl.
CPC ............... *H04L 12/1886* (2013.01)
(58) Field of Classification Search
None
See application file for complete search history.

(56) References Cited

U.S. PATENT DOCUMENTS

| | | | | |
|---|---|---|---|---|
| 7,724,745 B1* | 5/2010 | Elangovan | .......... | H04L 12/1886 370/392 |
| 8,451,715 B1* | 5/2013 | Doshi et al. | .................. | 370/218 |
| 8,594,088 B2* | 11/2013 | Saltsidis | ............. | H04L 12/1836 370/236 |
| 2011/0019678 A1* | 1/2011 | Mehta et al. | ................. | 370/401 |
| 2012/0063465 A1* | 3/2012 | Keesara et al. | ............... | 370/401 |
| 2014/0369184 A1 | 12/2014 | Keesara et al. | | |
| 2015/0156108 A1* | 6/2015 | Shi | ...................... | H04L 12/4658 370/218 |

* cited by examiner

*Primary Examiner* — Khaled Kassim
*Assistant Examiner* — Zhaohui Yang

(57) ABSTRACT

A method, apparatus and computer program product for prevention of duplication and looping of multicast traffic within a multi-homed cluster of backbone edge bridges is presented. Multicast traffic is received on a first Access device (AD). The multicast traffic is forwarded from the first AD to a first Backbone edge Bridge (BEB). Any available Backbone Virtual Local Area Network (BVLAN) is chosen to forward the multicast traffic into a transport network by the first BEB. The multicast traffic is received at a second BEB from said first BEB. A determination is made whether a nickname in a packet of the multicast traffic is a nickname of the first BEB and when the nickname in the packet matches a nickname of the first BEB then abstaining from making copies of said packet for said first AD and said second AD.

18 Claims, 8 Drawing Sheets

OPTIMIZATION OF RULES USED FOR PREVENTION OF DUPLICATION AND LOOPING OF MULTICAST TRAFFIC WITHIN A MULTI-HOMED CLUSTER OF BACKBONE EDGE BRIDGES IN A SHORTEST PATH BRIDGING MULTICAST NETWORK

BACKGROUND

A Shortest Path Bridging Multicast (SPBM) Network uses Backbone Virtual Local Area Networks (BVLANs) to identify End-to-End Equal Cost paths in the network. A traffic flow is mapped at the edge of the SPBM Network (by the Ingress Node) to one of the BVLANs used in the network. By extension this also determines the path taken by that particular traffic flow in the network. A multicast flow is not only sent via the Network-to-Network Interfaces (NNIs) into the SPBM as encapsulated frames, but it could also be sent into other UNIs as un-encapsulated frames. In non-multi-homed deployments current implementations of SPBM assign different Internet Protocol (IP) Multicast streams within a Multicast over SPB Network to different BVLANs.

SUMMARY

Conventional mechanisms such as those explained above suffer from a variety of deficiencies. One such deficiency is that in multi-homed environments the current solution limits an Ingress Backbone Edge Bridge (BEB) within a Multi-Homed cluster to a single BVLAN that it can use when it sends encapsulated multicast traffic into the SPBM network. This is done because of the rule implemented on the Egress BEB to prevent duplication and looping of multicast traffic.

The current rule for traffic received on the NNI and going towards one or more multi-Homed User Network Interfaces (UNIs) is as follows: based on the incoming BVLAN—derive a mask of out-going UNI ports called the UNI Port Blocking Mask for that BVLAN. Block copies of the multicast stream from being sent on ports that have a bit set in the Port Blocking mask derived above. The mask is to be set such that for each BVLAN—one of the BEBs does not block any ports, while other BEBs in the cluster block all ports.

This conventional rule solves two problems. First, for traffic received at the NNI from other nodes in the SPBM network which are not in the same Multi-Homed Cluster, the conventional rule ensures that only one of the BEBs in the cluster makes copies of the packet and sends it into the UNIs. Second, for traffic coming from one of the BEBs within the cluster—it ensures that the other BEBs in the cluster do not make copies and send it to the Multi-Homed UNIs. This is important, because the Ingress BEB which is already part of the same cluster would have already sent the stream into the Multi-Homed UNIs.

Use of the conventional rule however does create an inefficiency problem. Because the rule to block traffic form going to the Multi-Homed UNIs used by the Egress BEB is based on BVLAN—the Ingress BEB cannot use any BVLAN it wants. For example in a Dual Homed environment with two BVLANs—assume that the Ingress BEB-A within a cluster used both BVLANs say X and Y. The cluster partner (say B) would receive the traffic form A over the NNI. It will make copies of one of the two BLVANs (say Y) and send to the Dual-Homed UNIs that it shares with A. But this causes duplication, because A would have already sent traffic to the Dual-Homed UNIs when it originally processed the packets.

What is needed is an adjustment to the rule on the Egress BEB (currently just based on BVLANs) that allows the Ingress BEB within a multi-Homed cluster to use multiple B-VLANs for multicast traffic, without causing traffic duplication. A solution that allows the Ingress BEB to assign different flows to different BVLANs is more efficient than one that selects the same BVLAN for all flows. As a general rule—being able to exercise more BVLANs is better than limiting the traffic to a fewer BVLANs.

In a particular embodiment of a method for optimization of rules for prevention of duplication and looping of multicast traffic within a multi-homed cluster of backbone edge bridges the method includes for a network system having a transport network and a cluster of at least a first Backbone Edge Bridge (BEB) and a second BEB each of the first BEB and the second BEB in communication with the transport network, a first multihomed Access Device (AD) and a second multihomed AD, receiving multicast traffic on the first AD. The method further includes forwarding the multicast traffic from the first AD to the first BEB and choosing any available Backbone Virtual Local Area Network (BVLAN) to forward the multicast traffic into the transport network by the first BEB. Additionally the method includes receiving the multicast traffic at the second BEB from the first BEB and determining whether a nickname in a packet of the multicast traffic is a nickname of the first BEB and when the nickname in the packet matches a nickname of the first BEB then abstaining from making copies of the packet for the first AD and the second AD.

Other embodiments include a computer readable medium having computer readable code thereon for providing optimization of rules for prevention of duplication and looping of multicast traffic within a multi-homed cluster of backbone edge bridges. The computer readable medium includes instructions wherein for a network system having a transport network and a cluster of at least a first Backbone Edge Bridge (BEB) and a second BEB each of the first BEB and the second BEB in communication with the transport network, a first multihomed Access Device (AD) and a second multihomed AD, receiving multicast traffic on the first AD. The computer readable medium further includes instructions for forwarding the multicast traffic from the first AD to the first BEB and choosing any available Backbone Virtual Local Area Network (BVLAN) to forward the multicast traffic into the transport network by the first BEB. Additionally the computer readable medium includes instructions for receiving the multicast traffic at the second BEB from the first BEB and determining whether a nickname in a packet of the multicast traffic is a nickname of the first BEB and when the nickname in the packet matches a nickname of the first BEB then abstaining from making copies of the packet for the first AD and the second AD.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides optimization of rules for prevention of duplication and looping of multicast traffic within a multi-homed cluster of backbone edge bridges as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing optimization of rules for prevention of duplication and looping of multicast traffic within a multi-homed cluster of backbone edge bridges as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below. All examples and features mentioned below can be combined in any technically possible way.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
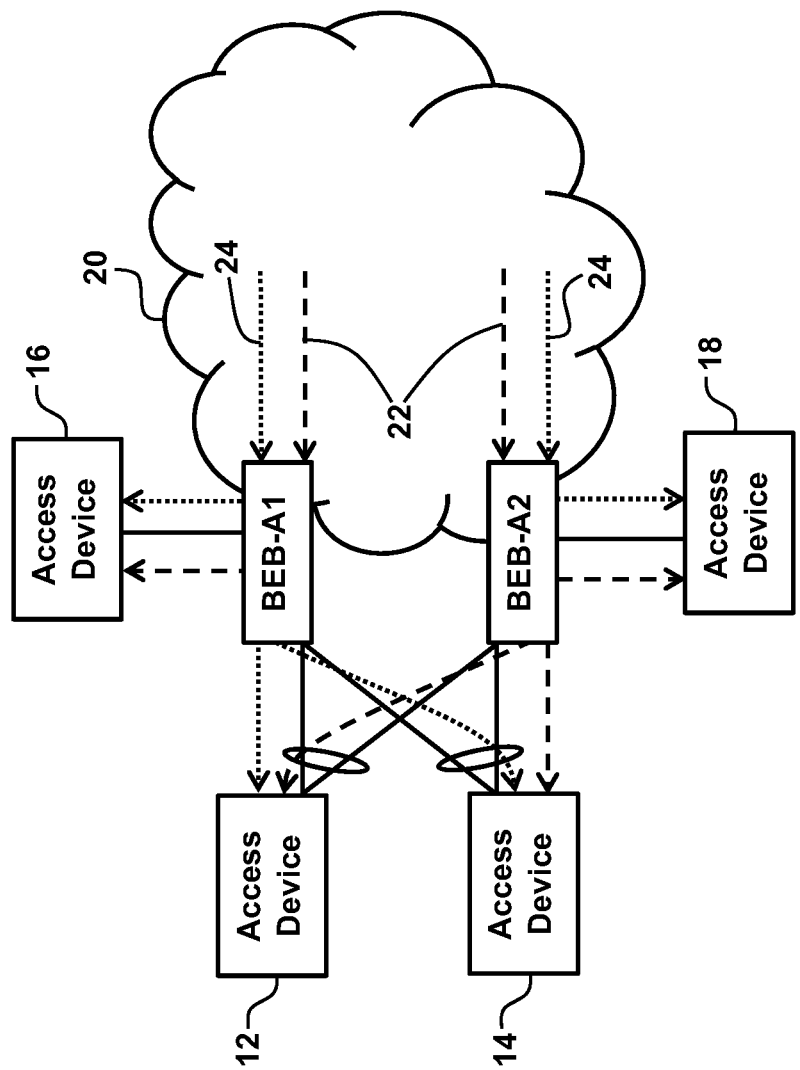
FIG. 1 is a high level block diagram of a network system having dual homed edge devices.

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

The preferred embodiment of the invention will now be described with reference to the accompanying drawings. The invention may, however, be embodied in many different forms and should not be construed as limited to the embodiment set forth herein; rather, this embodiment is provided so that this disclosure will be thorough and complete, and will fully convey the scope of the invention to those skilled in the art. The terminology used in the detailed description of the particular embodiment illustrated in the accompanying drawings is not intended to be limiting of the invention. In the drawings, like numbers refer to like elements.

Referring to FIG. 1, a portion of a prior art network 10 is shown. Network 10 includes a pair of multi-homed Access Devices (ADs) 12 and 14 as well as Backbone Edge Bridges (BEBs). ADs 12 and 14 are multi-homed ADs and are in communication with a BEB-A1 and BEB-A2. BEB-A1 Is in communication with SPB network 20 and with single-homed AD 16. BEB-A2 is in communication with SPB network 20 and with single-homed AD 18. When multicast traffic arrives at a BEB, and that BEB owns the Backbone Virtual Local Area Network (BVLAN) the traffic arrived on, then that BEB will forward the traffic to single-homed ADs and to multihomed ADs. If the BEB doesn't own the BVLAN the traffic arrived on, then the BEB will only copy the traffic to the single-homed ADs it connects with.

If a BEB receives multicast traffic and needs to copy and send to uniports only attached to one of the BEBs. The BEB will make a copy unconditionally and send it without fear of loops or duplication. But for multiple devices in cluster, (e.g., ADs 12 and 14) only one of the BEBs will send copies. For a singly attached device, no matter what BVLAN the multicast traffic arrives on, the BEB will make a copy and send to access side but for devices connected to more than one BEB a rule is provided that all BEBs follow to ensure that only one BEB makes copies. The rule says if traffic comes on primary BVLAN then the primary BEB makes a copy and sends to dual attached device. If traffic comes on secondary BVLAN then the secondary BEB makes copy and sends out to dual attached device. Stated differently, one BEB will forward to multihomed devices based on the BVLAN the traffic arrived on. At a BEB if traffic arrived on the BVLAN owned by that BEB, then that BEB will send to multi-accessed devices. Otherwise the BEB won't send because some other BEB will take care of it. Accordingly, only one copy of traffic is sent.

In FIG. 1 an example is described. When multicast traffic arrives on BVLAN 22, it will be received by both BEB-A1 and BEB-A2. For BEB-A1, since BEB-A1 doesn't own the BVLAN 22, BEB-A1 will only copy the traffic to AD 16. For BEB-A2, since BEB-A2 does own the BVLAN 22, BEB-A2 will copy the traffic to AD 18 and also to AD 12 and AD 14.

When multicast traffic arrives on BVLAN 24, it will be received by both BEB-A1 and BEB-A2. For BEB-A1, since BEB-A1 does own the BVLAN 24, BEB-A1 will copy the traffic to AD 16 and also to AD 12 and AD 14. For BEB-A2, since BEB-A2 doesn't own the BVLAN 24, BEB-A2 will only copy the traffic to AD 18. In this manner duplication and looping of multicast packets is avoided.

Figure 2:
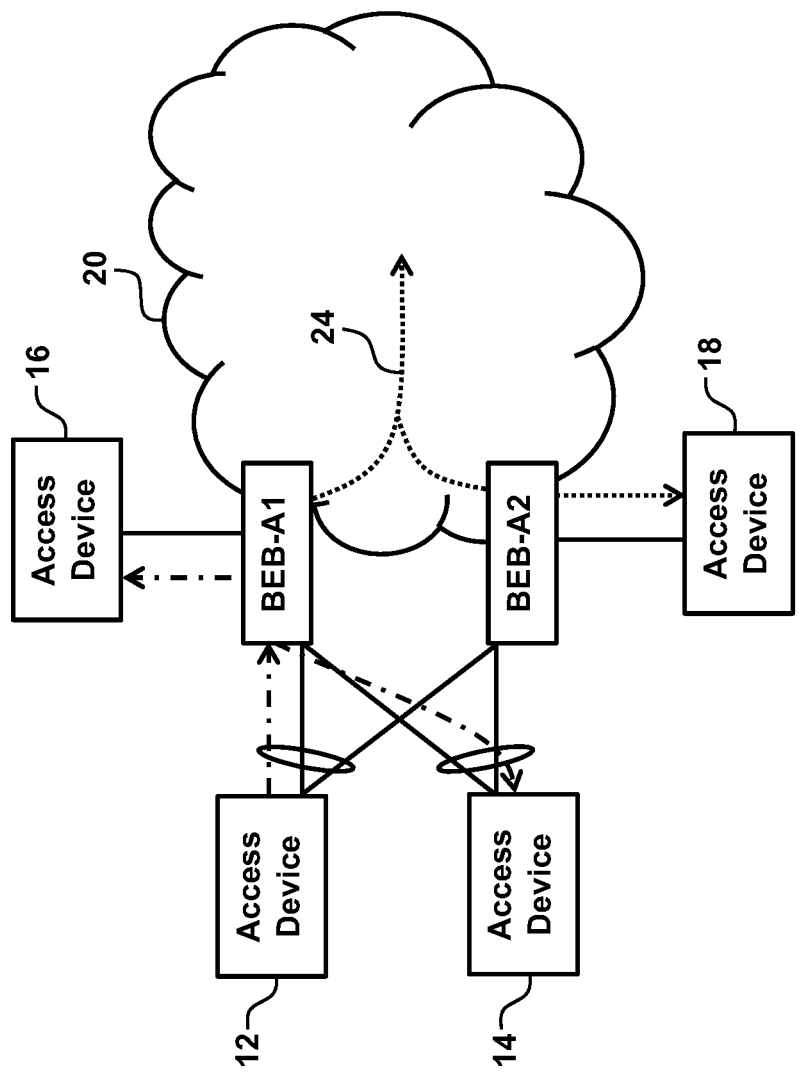
FIG. 2 is a high level block diagram of a network system having dual homed edge devices.
Figure 3:
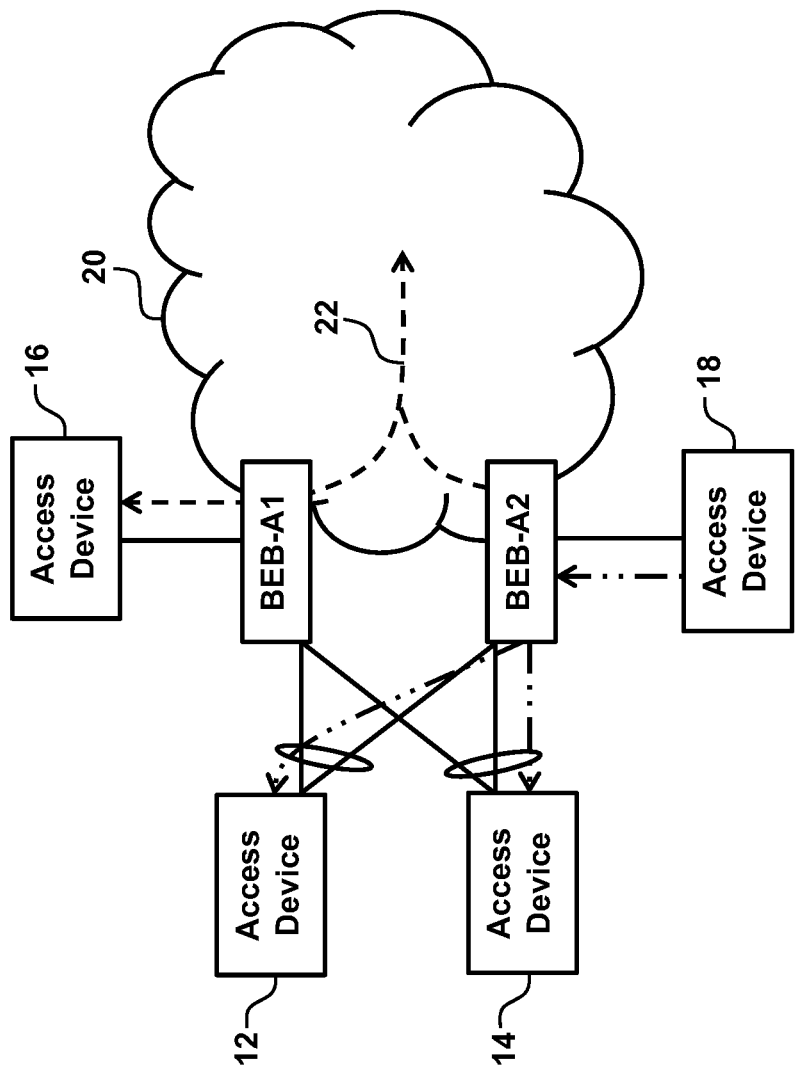
FIG. 3 is a high level block diagram of a network system having dual homed edge devices.

Referring now to FIG. 2, a multicast packet received from AD 12 is received at BEB-A1. BEB-A1 will copy the packet to AD 16, to AD 14, to BEB-A2 and out to the network 20. BEB-A2 will copy the packet to AD 18. A similar scenario is shown in FIG. 3, wherein a multicast packet received from AD 18 is received at BEB-A2. BEB-A2 will copy the packet to AD 12, to AD 14, to BEB-12 and out to the network 20. BEB-A1 will copy the packet to AD 16.

The scenario described above with respect to FIGS. 2 and 3 can create an inefficiency problem. Because the rule to block traffic form going to the Multi-Homed UNIs, used by the Egress BEB is based on BVLAN—the Ingress BEB cannot use any BVLAN it wants. For example in a Dual Homed environment with two BVLANs—assume that the Ingress BEB-A1 within a cluster uses two BVLANs. The cluster Partner (BEB-A2) would receive the traffic form BEB-A1 over the NNI. It will make copies of one of the two BLVANs and send to the Dual-Homed UNIs (AD 12 and AD 14) that it shares with BEB-A1. But this causes duplication, because BEB-A1 would have already sent traffic to the Dual-Homed UNIs when it originally processed the packets.

A new rule is presented regarding multicast traffic and multihomed access devices. First, instead of a BEB using only a single BVLAN, a BEB can use any available BVLAN selected from multiple BVLANS. Multiple flows can now use multiple paths. For egress BEBs, if a nickname in a packet is a nickname of one of the multihomed ADs, do not make copies for multihomed ADs, otherwise follow old rules.

Figure 4:
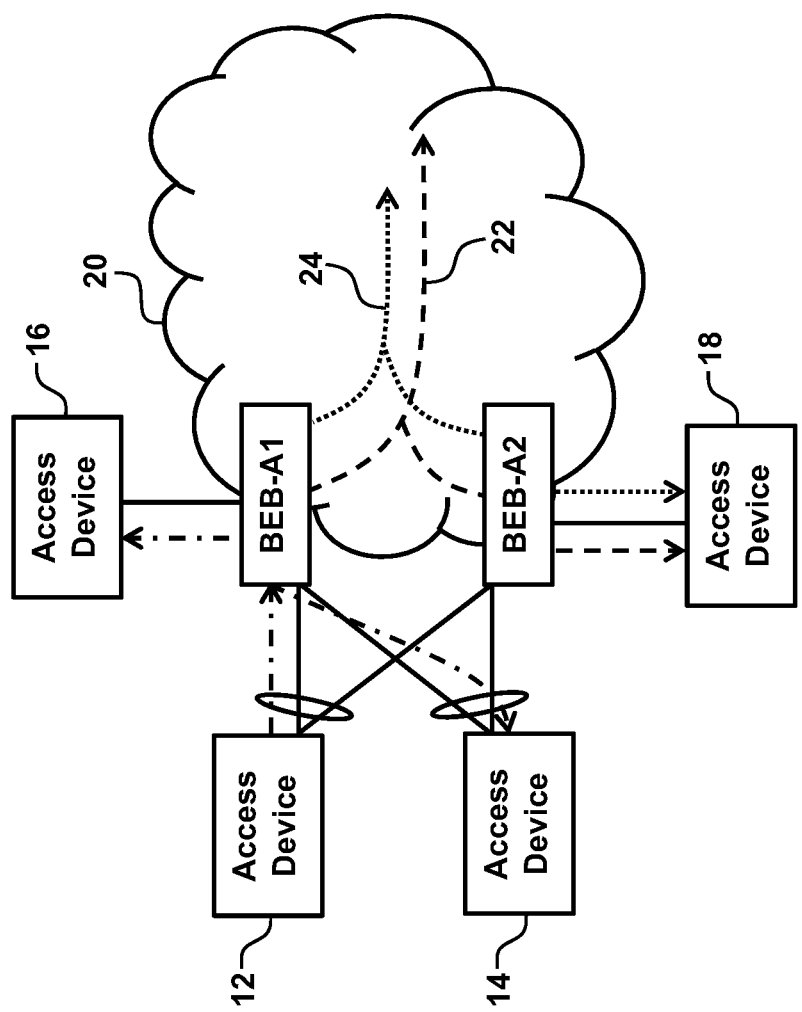
FIG. 4 is a high level block diagram of a network system having dual homed edge devices

FIG. 4 shows a block diagram of the network 50 in accordance with embodiment of the present invention. Here, a multicast packet received from AD 12 is received at BEB-A1. BEB-A1 will copy the packet to AD 16, to AD 14, to BEB-A2 and out to the network 20 on either BVLAN 22 or BVLAN 24. BEB-A2 will copy the packet to AD 18. While prior to the new rule BEB-A2 could have also copied the packet to AD 12 and AD 14 dependent upon which VLAN was selected by BEB-A1, the new rule states that the nickname in the packet is checked, and if the nickname in the BMAC_DA of the multicast packet matches the nickname of a mulithomed partner, then do not make copies for multihomed ADs, otherwise follow old rules.

Figure 5:
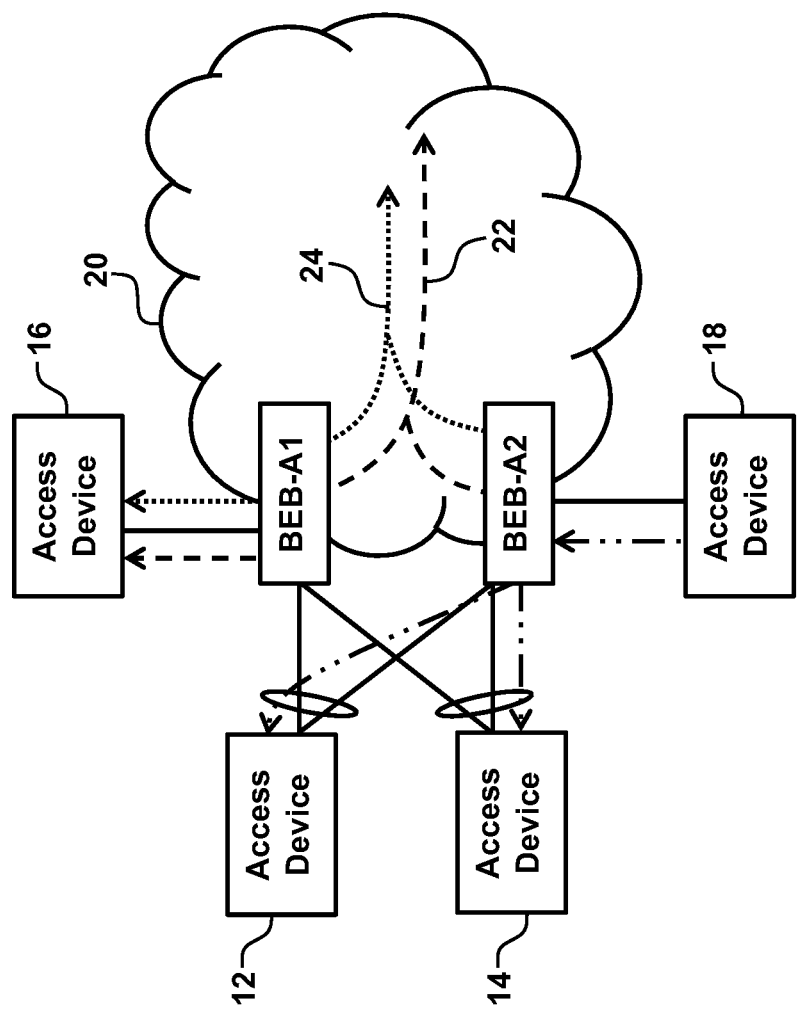
FIG. 5 is a high level block diagram of a network system having dual homed edge devices

A similar scenario is shown in FIG. 5, wherein a multicast packet received from AD 18 is received at BEB-A2. BEB-A2 will copy the packet to AD 12, to AD 14, to BEB-A1 and out to the network 20. BEB-A1 will copy the packet to AD 16. To avoid any unnecessary duplication, that the nickname of the packet is checked, and if the nickname in the packet matches the nickname of a mulithomed partner, then do not make copies for multihomed ADs, otherwise follow old rules.

One of the advantages provided by the new rules is that they allow the Ingress BEB to select any BVLAN allowing for multicast traffic to use more paths in the network. Further, as long as all the BEBs within a Cluster implement the same rule on Egress—the interoperability with the rest of the network is guaranteed. So not all clusters need to be upgraded at the same time. It allows for a mix of clusters some implementing the base solution and some other clusters using the improvements described in this disclosure to exist in the same network.

Figure 6A:
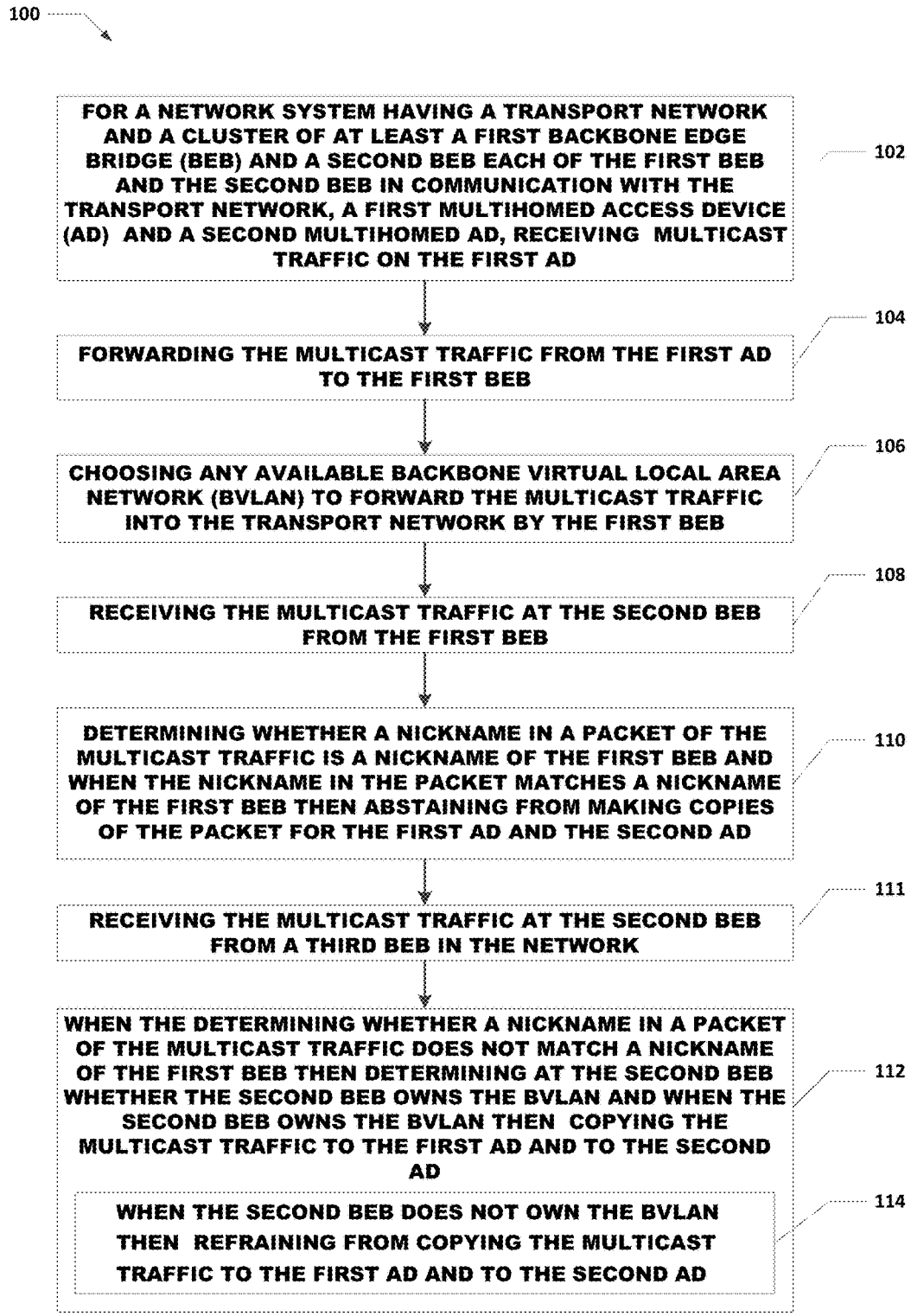
FIGS. 6A and 6B are flow diagram of a particular embodiment of a method for preventing duplication and looping of multicast traffic in accordance with embodiments of the invention.
Figure 6B:
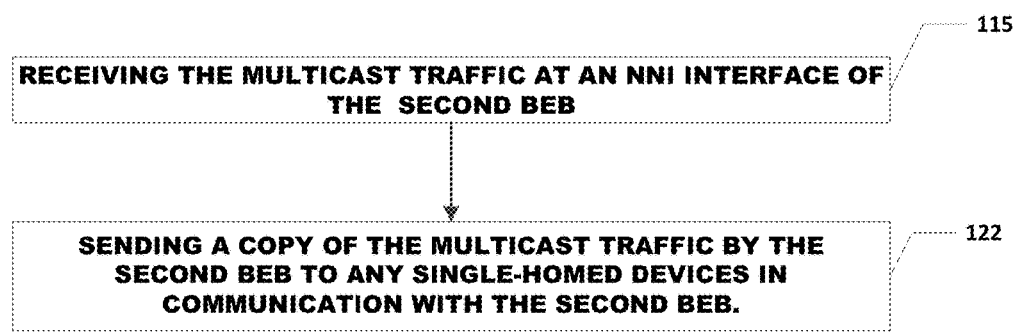

A flow chart of a particular embodiment of the presently disclosed method is depicted in FIGS. 6A and 6B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Method 100 begins with processing block 102 which discloses for a network system having a transport network and a cluster of at least a first Backbone Edge Bridge (BEB) and a second BEB each of the first BEB and the second BEB in communication with the transport network, a first multihomed Access Device (AD) and a second multihomed AD, receiving multicast traffic on the first AD.

Processing block 104 states forwarding the multicast traffic from the first AD to the first BEB. Processing block 106 recites choosing any available Backbone Virtual Local Area Network (BVLAN) to forward the multicast traffic into the transport network by the first BEB.

Processing block 108 discloses receiving the multicast traffic at the second BEB from the first BEB. Processing block 110 states determining whether a nickname in a packet of the multicast traffic is a nickname of the first BEB and when the nickname in the packet matches a nickname of the first BEB then abstaining from making copies of the packet for the first AD and the second AD.

Processing block 111 discloses receiving the multicast traffic at the second BEB from a third BEB in the network. Processing block 112 recites when the determining whether a nickname in a packet of the multicast traffic does not match a nickname of the first BEB then determining at the second BEB whether the second BEB owns the BVLAN and when the second BEB owns the BVLAN then copying the multicast traffic to the first AD and to the second AD. As further shown in processing block 114 when the second BEB does not own the BVLAN then refraining from copying the multicast traffic to the first AD and to the second AD Processing continues with processing block 115 which states receiving the multicast traffic at an NNI interface of the second BEB. Processing block 122 states sending a copy of the multicast traffic by the second BEB to any single-homed devices in communication with the second BEB.

Figure 7:
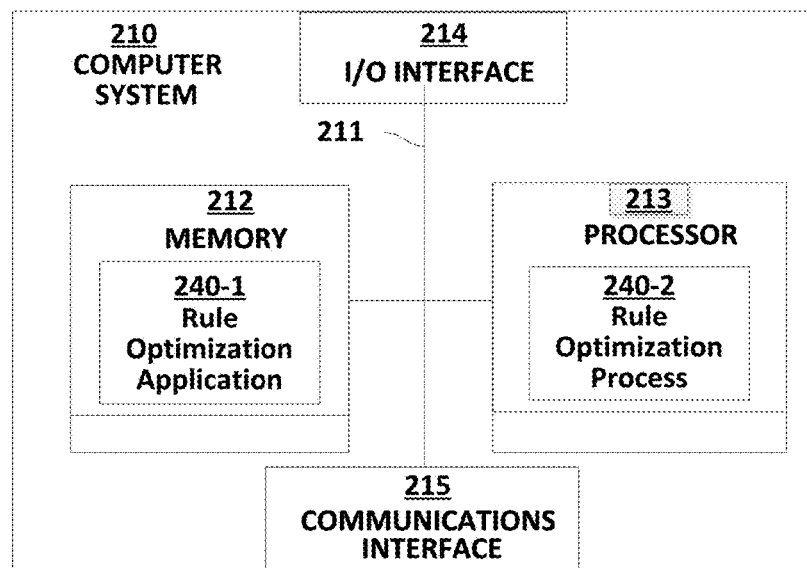
FIG. 7 illustrates an example computer system architecture for a computer system that preventing duplication and looping of multicast traffic in accordance with embodiments of the invention.

FIG. 7 is a block diagram illustrating example architecture of a computer system 210 that executes, runs, interprets, operates or otherwise performs a rule optimization operating application 240-1 and rule optimization operating process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a rule optimization operating application 240-1 as explained herein. The rule optimization operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a rule optimization operating application 240-1. Execution of a rule optimization operating application 240-1 in this manner produces processing functionality in the rule optimization operating process 240-2. In other words, the rule optimization operating process 240-2 represents one or more portions or runtime instances of a rule optimization operating application 240-1 (or the entire a rule optimization operating application 240-1) performing or executing within or upon the processor 213 in the computerized device 210 at runtime.

It is noted that example configurations disclosed herein include the rule optimization operating application 240-1 itself (i.e., in the form of un-executed or non-performing logic instructions and/or data). The rule optimization operating application 240-1 may be stored on a computer readable medium (such as a floppy disk), hard disk, electronic, magnetic, optical, or other computer readable medium. A rule optimization operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a rule optimization operating application 240-1 in the processor 213 as the rule optimization operating process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the rule optimization application 240-1. Execution of rule optimization application 240-1 produces processing functionality in rule optimization process 240-2. In other words, the rule optimization process 240-2 represents one or more portions of the rule optimization application 240-1 (or the entire application) performing within or upon the processor 213 in the computer system 200.

It should be noted that, in addition to the rule optimization process 240-2, embodiments herein include the rule optimization application 240-1 itself (i.e., the un-executed or non-performing logic instructions and/or data). The rule optimization application 240-1 can be stored on a computer readable medium such as a floppy disk, hard disk, or optical medium. The rule optimization application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of rule optimization application 240-1 in processor 213 as the rule optimization process 240-2. Those skilled in the art will understand that the computer system 200 can include other processes and/or software and hardware components, such as an operating system that controls allocation and use of hardware resources associated with the computer system 200.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
   in a network system comprising a transport network and a cluster of at least a first Backbone Edge Bridge (BEB) and a second BEB, wherein each of the first BEB and the second BEB is in communication with the transport network, a first multihomed Access Device (AD), and a second multihomed AD, receiving, by the first BEB, multicast traffic from the first AD;
   choosing, by the first BEB, any available Backbone Virtual Local Area Network (BVLAN) from a plurality of available BVLANs across the transport network to forward the multicast traffic into the transport network;
   receiving, via the chosen BVLAN, the multicast traffic at the second BEB from the first BEB;
   determining, by the second BEB, whether a nickname in a packet of the multicast traffic is a nickname of the first BEB, wherein:
   when the nickname in the packet does not match a nickname of the first BEB, determining whether to make a copy of the packet for the first AD and the second AD based on the chosen BVLAN, and
   when the nickname in the packet matches the nickname of the first BEB making no copies of the packet for the first AD and the second AD.

2. The method of claim 1 further comprising sending a copy of the multicast traffic received by the first BEB to any single-homed devices in communication with the first BEB.

3. The method of claim 1 further comprising sending a copy of the multicast traffic received by the second BEB to any single-homed devices in communication with the second BEB.

4. The method of claim 1, comprising:
   when the nickname in the packet of the multicast traffic does not match the nickname of the first BEB, determining, by the second BEB, whether the second BEB owns the chosen BVLAN, wherein:
   when the second BEB owns the chosen BVLAN, copying, by the second BEB, the multicast traffic to the first AD and to the second AD, and
   when the second BEB does not own the chosen BVLAN, making no copies, by the second BEB, of the multicast traffic for the first AD and the second AD.

5. The method of claim 1 further comprising:
   receiving other multicast traffic at the second BEB from a third BEB over a particular one of the available BVLANs in the transport network;
   determining, by the second BEB, whether a second nickname in a packet of the other multicast traffic does not match the nickname of the first BEB; and
   determining, by the second BEB, whether the second BEB owns the particular one BVLAN, wherein when the second BEB owns the particular one BVLAN, then copying, by the second BEB, the other multicast traffic to the first AD and to the second AD.

6. The method of claim 1 further comprising:
   receiving the multicast traffic at a Network-to-Network (NNI) interface of the second BEB; and
   sending a copy of the multicast traffic by the second BEB to any single-homed devices in communication with the second BEB.

7. A computer program product for optimization of rules for prevention of duplication and looping of multicast traffic within a cluster of backbone edge bridges, comprising:
   a distributed non-transitory computer readable storage medium having computer readable program code embodied therewith, the computer readable program code, when implemented in a network system having a transport network and a cluster of at least a first Backbone Edge Bridge (BEB) and a second BEB, wherein each of said first BEB and said second BEB is in communication with said transport network, a first multihomed Access Device (AD) and a second multihomed AD, comprising;
   first computer readable program code for receiving said multicast traffic from said first AD to said first BEB;
   the first computer readable program code further comprising computer program code for choosing any available Backbone Virtual Local Area Network (BVLAN) from a plurality of available BVLANs across the transport network to forward said multicast traffic into said transport network by said first BEB;
   second computer readable program code for receiving, via the chosen BVLAN, said multicast traffic at said second BEB from said first BEB;

the second computer readable program code further comprising computer program code for determining, by the second BEB, whether a nickname in a packet of said multicast traffic is a nickname of said first BEB, wherein
when said nickname in said packet does not match the nickname of the first BEB, determining whether to make a copy of the packet for the first AD and the second AD based on the chosen BVLAN, and
when said nickname in said packet matches a nickname of said first BEB then making no copies of said packet for said first AD and said second AD.

8. The computer program product of claim 7, wherein the first computer readable program code further comprises computer program code for sending a copy of said multicast traffic received by said first BEB to any single-homed devices in communication with said first BEB.

9. The computer program product of claim 7, wherein the second computer readable program code further comprises computer program code for sending a copy of said multicast traffic received by said second BEB to any single-homed devices in communication with said second BEB.

10. The computer program product of claim 8, wherein when said nickname in said packet of said multicast traffic does not match the nickname of said first BEB, determining by said second BEB whether said second BEB owns said chosen BVLAN, wherein
when said second BEB owns said chosen BVLAN, copying, by the second BEB, said multicast traffic to said first AD and to said second AD, and
when said second BEB does not own said chosen BVLAN, making no copies, by the second BEB, of said multicast traffic for said first AD and said second AD.

11. The computer program product of claim 7, wherein:
the second computer readable program code further comprises computer program code for receiving other multicast traffic at said second BEB from a third BEB over a particular one of the available BVLANs in said transport network;
the second computer readable program code further comprises computer program code for determining, by the second BEB, whether a second nickname in a packet of the other multicast traffic does not match the nickname of the first BEB; and
the second computer readable program code further comprises computer program code for determining, by the second BEB, whether the second BEB owns the particular one BVLAN, wherein when the second BEB owns the particular one BVLAN then copying, by the second BEB, the other multicast traffic to the first AD and to the second AD.

12. The computer program product of claim 7, wherein:
the second computer readable program code further comprises computer program code for receiving the multicast traffic at a Network-to-Network (NNI) interface of said second BEB and sending a copy of said multicast traffic by said second BEB to any single-homed devices in communication with said second BEB.

13. A computer system comprising:
a network system comprising a transport network and a cluster of at least a first Backbone Edge Bridge (BEB) and a second BEB, wherein each of said first BEB and said second BEB is in communication with said transport network, a first multihomed Access Device (AD), and a second multihomed AD,
the first BEB comprising:
a first memory storing first computer readable code for providing optimization of rules for prevention of duplication and looping of multicast traffic within the cluster of backbone edge bridges;
a first processor;
a first communications interface;
a first interconnection mechanism coupling the first memory, the first processor, and the first communications interface, wherein the first processor when executing the first computer readable code:
receives multicast traffic from the first AD; and
chooses any available Backbone Virtual Local Area Network (BVLAN) from a plurality of available BVLANs across the transport network to forward said multicast traffic into said transport network;
the second BEB comprising:
a second memory storing second computer readable code for providing optimization of rules for prevention of duplication and looping of multicast traffic within the cluster of backbone edge bridges;
a second processor;
a second communications interface;
a second interconnection mechanism coupling the second memory, the second processor, and the second communications interface, wherein the second processor when executing the second computer readable code:
receives, via the chosen BVLAN, the multicast traffic from the first BEB;
determines whether a nickname in a packet of the multicast traffic is a nickname of the first BEB, wherein:
when the nickname in the packet does not match the nickname of the first BEB, determines whether to make a copy of the packet for the first AD and the second AD based on the chosen BVLAN, and
when said nickname in the packet matches the nickname of the first BEB, makes no copies of the packet for the first AD and the second AD.

14. The computer system of claim 13, wherein the first processor when executing the first computer readable code:
sends a copy of the multicast traffic received by the first BEB to any single-homed devices in communication with the first BEB.

15. The computer system of claim 13, wherein the second processor when executing the second computer readable code:
sends a copy of the multicast traffic received by the second BEB to any single-homed devices in communication with the second BEB.

16. The computer system of claim 13, wherein when the nickname in the packet of the multicast traffic does not match the nickname of the first BEB, the second processor when executing the second computer readable code:
determines whether the second BEB owns the chosen BVLAN, wherein:
when the second BEB owns the chosen BVLAN, copies the multicast traffic to the first AD and to the second AD, and
when the second BEB does not own the chosen BVLAN, makes no copies of the multicast traffic for the first AD and the second AD.

17. The computer system of claim 13, wherein the second processor when executing the second computer readable code:

receives other multicast traffic from a third BEB over a particular one of the available BVLANs in the transport network;

determines whether a second nickname in a packet of the other multicast traffic does not match the nickname of the first BEB; and determines whether the second BEB owns the particular one BVLAN, wherein when the second BEB owns the particular one BVLAN, then copying the other multicast traffic to the first AD and to the second AD.

18. The computer system of claim 13, wherein the second processor when executing the second computer readable code:

receives the multicast traffic at a Network-to-Network (NNI) interface of the second BEB; and sends a copy of the multicast traffic to any single-homed devices in communication with the second BEB.

\* \* \* \* \*

UNITED STATES PATENT AND TRADEMARK OFFICE
CERTIFICATE OF CORRECTION

| | |
|---|---|
| PATENT NO. | : 9,584,333 B2 |
| APPLICATION NO. | : 14/136240 |
| DATED | : February 28, 2017 |
| INVENTOR(S) | : Srikanth Keesara and Sakthivadivu Saravanaraj |

It is certified that error appears in the above-identified patent and that said Letters Patent is hereby corrected as shown below:

In the Claims

Column 10, Line 39, "(NNI) interface of the second BEB; and" should read --Interface (NNI) of the second BEB; and--
Column 11, Line 24, "10. The computer program product of claim 8, wherein" should read --10. The computer program product of claim 7, wherein--
Column 11, Line 56, "cast traffic at a Network-to-Network (NNI) interface of" should read --cast traffic at a Network-to-Network Interface (NNI) of--
Column 13, Line 15, "(NNI) interface of the second BEB; and" should read --Interface (NNI) of the second BEB; and--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*